Patented Feb. 22, 1927.

1,618,483

UNITED STATES PATENT OFFICE.

STANLEY D. SHIPLEY AND GUY C. GIVEN, OF STAMFORD, CONNECTICUT, ASSIGNORS TO ATLAS POWDER COMPANY, OF WILMINGTON, DELAWARE, A CORPORATION OF DELAWARE.

LACQUER AND LACQUER ENAMEL.

No Drawing. Application filed April 18, 1925. Serial No. 24,260.

This invention relates to lacquers and lacquer enamels; and it comprises a coating composition containing nitrocellulose held in solution with the aid of a butyl glycol; said coating composition also containing if desired various other coating materials such as resins, natural or artificial, non-solvents for nitrocellulose and diluent liquids, etc.; and it further comprises the improvement in the art of making coating compositions which consists in bringing nitrocellulose into solution with the air of a butyl glycol, such butyl glycol being that derived by replacing one hydrogen of a hydroxyl of ethylene glycol by a butyl group, this group being either normal butyl or isobutyl, but advantageously the normal; all as more fully hereinafter set forth and as claimed.

Nitrocellulose forms the basis of a wide variety of coating compositions such as varnishes, enamels and lacquers. In making these compositions it is brought into solution with the aid of a wide variety of solvents and it is found in practice that the particular solvent employed has very great influence upon not only the properties of the varnish made with it but upon the properties of the film or coating left after drying. Sometimes the solution of nitrocellulose is not very strong, as where a thin film coating is wanted, and sometimes it is relatively strong; the proportions of nitrocellulose used in solution ranging from, say, 5 ounces of nitrocellulose per gallon to as high as 20 ounces. Even higher proportions are sometimes used, say up to 40 and 60 ounces per gallon, this however being for special purposes. The various solvents employed vary very widely in their solvent power for nitrocellulose and in the viscosity of the solutions formed. They also vary in volatility with a consequent variation in the drying of the varnishes produced by their aid. To secure certain well known advantages it is often the practice to mix the solution of nitrocellulose with various "non-solvents" such as benzene, toluene, xylene, gasoline, etc. These thin the solution and change the viscosity and they have further an important advantage lowering the cost of the finished product. Various alcohols, ethyl, methyl, propyl, butyl, amyl, etc., are also employed as diluents. In making these compound solutions there is sometimes a tendency to separation or jellying of the nitrocellulose which is highly disadvantageous.

In another and prior Patent No. 1,533,616, of April 14, 1925, we have described and claimed coating compositions utilizing the advantageous properties of ethyl glycol which may be defined as the material resulting from the substitution of an ethyl group for the hydrogen of one hydroxyl of ethylene glycol. Ethyl glycol has a great advantage for this purpose in that its solvent power for nitrocellulose is very high; it dissolving freely some grades of nitrocellulose which are resistant to other solvents. It has similar solvent properties on other nitrocarbohydrates. The solutions formed withstand high dilution by non-solvents; it being practicable to obtain excellent varnish liquids wherein three parts of benzene are employed to one part of ethyl glycol.

We have found that the butyl glycols have similar advantages in making varnish enamels and lacquers with the aid of nitrocellulose; and in this relation evince some new and distinctive properties rendering them highly useful. The butyl glycol used may be either that corresponding to the replacement of a hydrogen in one hydroxyl of ethylene glycol by the normal butyl group or that obtained similarly with the isobutyl group. We find on the whole the former to be rather more advantageous. These butyl glycols while not dissolving nitrocellulose as freely as the ethyl glycol give solutions which are even more miscible with such hydrocarbons as benzene. The solutions made as a matter of fact are miscible and compatible with the various drying oils such as linseed oil, soy bean oil, Chinese wood oil, etc. The butyl glycols are also excellent solvents for a wide variety of artificial and natural resins, such as "ester gum", gum damar, kauri, etc.

These facts render the butyl glycols particularly suitable for making varnishes, lacquers and enamels in which the proportion of nitrocellulose is relatively small; that is where there is a considerable volume of thinning or diluent liquid to be added; and also for making composite varnishes and lacquers in which the nitrocellulose is only one of the coating components. As a matter of fact, with the use of the butyl glycols, nitrocellulose can be introduced into a wide variety of ordinary paints and varnishes.

In a specific embodiment of our invention making a lacquer of general applicability with the aid of butyl glycol, one part by weight of nitrocellulose may be dissolved in about seven parts by weight of a mixture of solvents comprising a butyl glycol, advantageously normal butyl glycol. It is advantageous to employ a relatively large proportion of diluents in this composition; say, three parts of non-solvent to every two parts of butyl glycol. The non-solvent employed may be benzene, toluene, xylene, or gasoline or a mixture of any two or more of these bodies. It is advantageous in many cases to use all four of the mentioned bodies together with perhaps a little more toluene than benzene. The mixture can be further thinned by the addition of about 25 per cent of an alcohol or a mixture of alcohols. A mixture of equal parts of commercial butyl alcohol and denatured alcohol is advantageous. The proportions given are merely illustrative but will suffice to produce a good lacquer. If an opaque enamel is wanted any of the ordinary compatible pigments may be ground into the above described lacquer. For many purposes about two parts of zinc oxide for each part of nitrocellulose will give good results. A little castor oil or a little camphor or both may be added to the mixture for some purposes. One of the great advantages of butyl glycol in these mixtures is its freedom from strong or offensive odor. Where odor is not material some or much of the butyl glycol may be replaced by ordinary nitrocellulose solvents, such as ethyl acetate, propyl acetate or amyl acetate or mixtures thereof. For example, in lieu of the 30 or 40 per cent of butyl glycol in the composite solvent mentioned above, about 10 per cent only may be used with 30 per cent or so of the various acetates, (one or more).

What we claim is:—

1. A coating composition comprising nitrocellulose, a butyl ether of ethylene glycol and a resin soluble in butyl ether of ethylene glycol.

2. A coating composition comprising nitrocellulose, a butyl ether of ethylene glycol, a resin soluble in butyl ether of ethylene glycol and a pigment.

3. A coating composition comprising nitrocellulose, a butyl ether of ethylene glycol, a resin soluble in butyl ether of ethylene glycol and a vegetable drying oil.

4. A coating composition comprising nitrocellulose, a butyl ether of ethylene glycol, a pigment and a vegetable drying oil.

5. A coating composition comprising nitrocellulose, a butyl ether of ethylene glycol, a resin soluble in butyl ether of ethylene glycol, a pigment and a vegetable drying oil.

6. A film comprising nitrocellulose, a butyl ether of ethylene glycol and a resin soluble in butyl ether of ethylene glycol.

7. A film comprising nitrocellulose, a butyl ether of ethylene glycol, a resin soluble in butyl ether of ethylene glycol and a pigment.

8. A film comprising nitrocellulose, a butyl ether of ethylene glycol, a resin soluble in butyl ether of ethylene glycol and a vegetable drying oil.

9. A film comprising nitrocellulose, a butyl ether of ethylene glycol, a pigment and a vegetable drying oil.

10. A film comprising nitrocellulose, a butyl ether of ethylene glycol, a resin soluble in butyl ether of ethylene glycol, a pigment and a vegetable drying oil.

In testimony whereof we have hereunto affixed our signatures.

STANLEY D. SHIPLEY.
GUY C. GIVEN.